Figure 6:
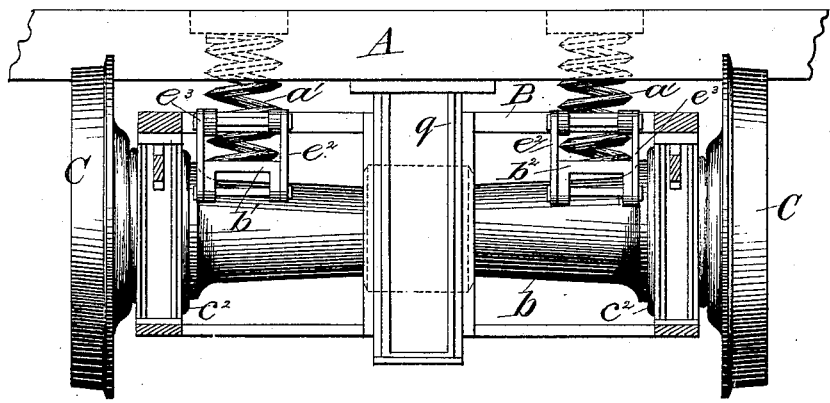

(No Model.) 3 Sheets—Sheet 1.
E. P. COWLES.
LOCOMOTIVE.
No. 303,491. Patented Aug. 12, 1884.
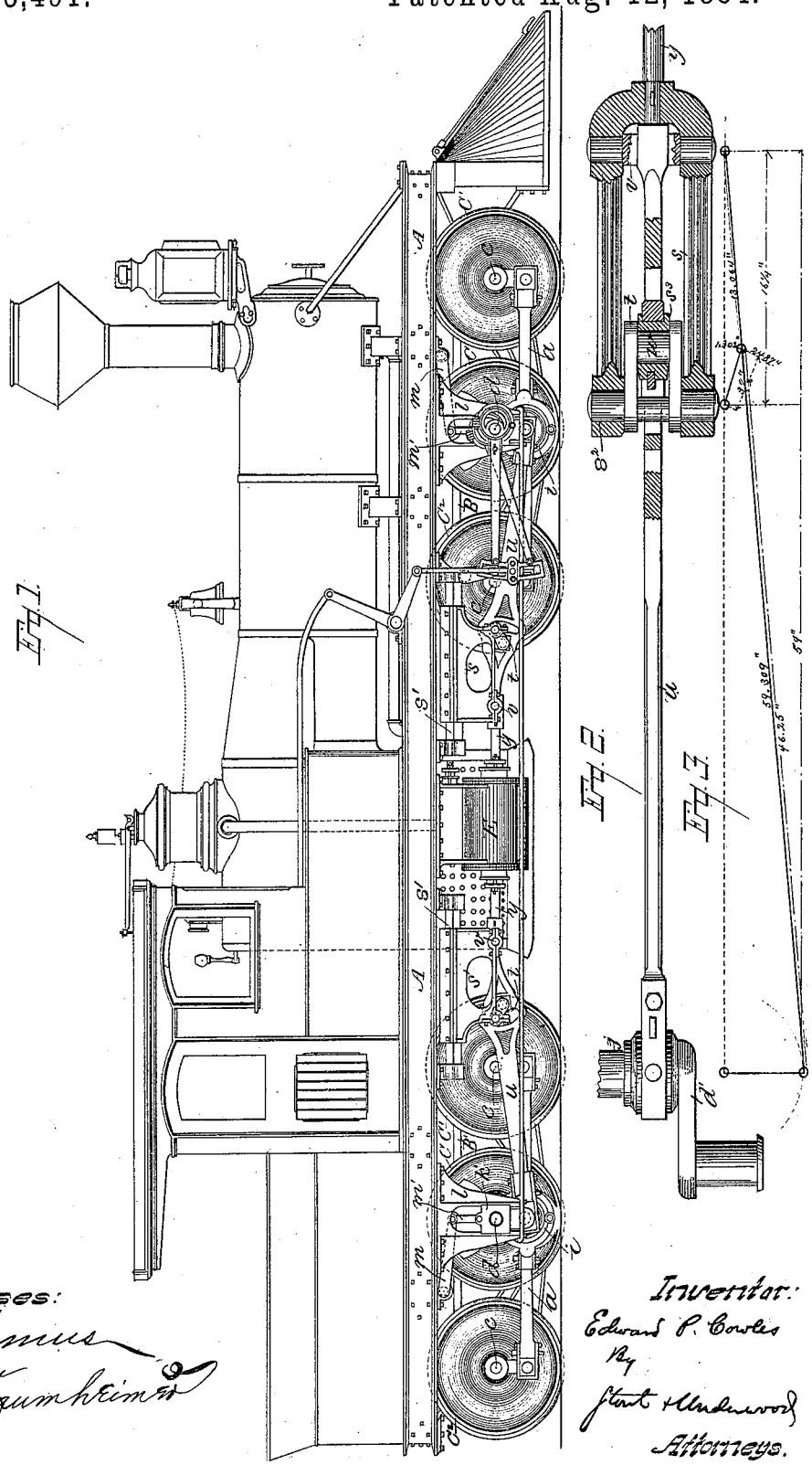
Witnesses:
E. G. Asmus
M. Baumheimer
Inventor:
Edward P. Cowles
By
Stout & Underwood
Attorneys.

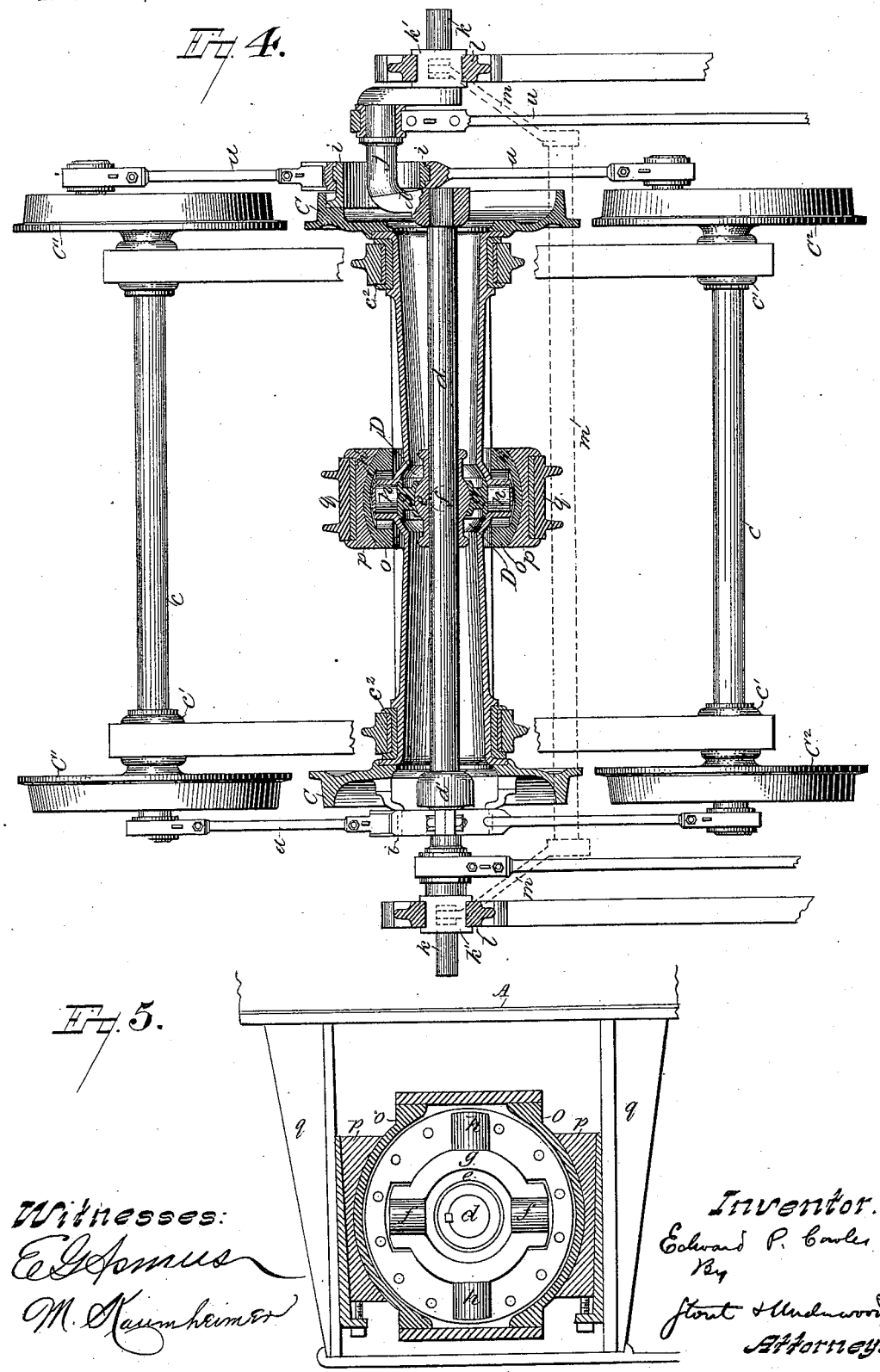

(No Model.)

3 Sheets—Sheet 3.

E. P. COWLES.

LOCOMOTIVE.

No. 303,491. Patented Aug. 12, 1884.

Witnesses:

Inventor:
Edward P. Cowles
By Stout & Underwood
Attorneys.

and tear of its working parts.
UNITED STATES PATENT OFFICE.

EDWARD P. COWLES, OF WEQUIOCK, WISCONSIN.

LOCOMOTIVE.

SPECIFICATION forming part of Letters Patent No. 303,491, dated August 12, 1884.

Application filed March 3, 1884. (No model.)

*To all whom it may concern:*

Be it known that I, EDWARD P. COWLES, of Wequiock, in the county of Brown, and in the State of Wisconsin, have invented certain new and useful Improvements in Railroad-Locomotives; and I do hereby declare that the following is a full, clear, and exact description thereof.

My invention relates to improvements in railroad-locomotives, and will be fully described hereinafter.

In the drawings, Figure 1 is a side elevation of a locomotive mounted on my improved trucks. Fig. 2 shows a peculiar construction of the connecting-rod. Fig. 3 is a diagram illustrating the working of the same. Fig. 4 is a top view of one of my trucks, the central wheels and axle of which are shown in horizontal section. Fig. 5 shows the mode of swiveling the central axle of the trucks to the locomotive-frame; and Fig. 6 is an end view of a truck with the rear axle removed, showing the attachment of the truck to the locomotive through the springs.

The object of my invention is to utilize the whole weight of the engine and tender for propelling purposes. The locomotive-frame, supporting both engine and tender, is for that purpose placed on a large number of driving-wheels so connected together and to the driving mechanism as to be absolutely free to swivel and twist with their trucks, thereby adjusting themselves to the curves, and to the inequalities of the railroad-track. In ordinary locomotives the twist occasioned by curves is thrown entirely against the front trucks, and so little play is allowed to the driving-wheels that they are practically rigid, the engine partaking of any side motion they may have. In a locomotive fitted with my appliances the twist will be equally divided between the front and rear trucks, so that from neither of them can said twist be suddenly communicated to the locomotive-frame. On uneven roads the locomotive would run with the gentle swaying motion common to the better class of passenger-coaches, and obviously with a material decrease in the wear and tear of its working parts.

A A indicate the locomotive-frame, supported on the front and rear trucks, B B'. Each of these trucks has six wheels, the front ones, C', and the rear ones, C², of which are fastened to ordinary axles, c c, running in suitable bearings, c' c', attached to the truck-frame. The central wheels, C, are mounted fast on the ends of the hollow axle b. In the central part of this axle b a spherical chamber, D, is formed, the bore of the axle from said chamber being given the shape of a cone-frustum, on the base of which a collar is formed for the wheel C.

c² c² are the box-bearings, by means of which the hollow axle b is journaled in the truck-frame.

Fitting loosely into the spherical chamber D of the hollow axle is a ball, e, and through the center of this ball the crank-shaft d is passed, both being held fast together by any suitable device. The ball e has two trunnions, f f, which work in the bearings of a ring, g. This latter has also two trunnions, h h, lying at right angles to the trunnions f f of the ball, and working in suitable bearings of the chamber D, the central zone of this latter being for that purpose extended out, as shown at h'. The outer rim of the ring g is convexed to bear evenly against the inner face of the chamber D, while the inner rim of said ring g is concaved to fit loosely over the ball e, the parts thus connected forming together a combined ball-and-socket or universal joint, by means of which the crank-shaft d is adapted to vibrate in every direction, as far as the conical bore of the axle b will allow, and to at the same time transmit to the said axle b the rotary motion received from the engine through the cranks d' d'.

The crank-pins i i of the wheels C, serving to attach the links a that couple the wheels C' and C² to said wheels C, are made hollow to allow of the passage of the wrist-pins j j of the cranks d' d' through them. The core of said hollow pins is therefore made of a diameter which will give to said cranks d' d' the same amount of play which the shaft d is capable of in the hollow axle b. The cranks d' d' are double, and have outer journals, k k, with box-bearings k' k', which are adapted to slide vertically in the slotted hanger l, attached to the frame A of the locomotive. By this arrangement the crank-shaft $d$ is maintained at right angles to the frame A, while, by means of a rocker-shaft, $m$, (shown in dotted lines in Fig. 4,) suitably hinged to the locomotive-frame and connected by rods $m'$ to the box-bearings $k' k'$, said shaft $d$ is maintained horizontally parallel with the said frame, and is also permitted an up-and-down motion in the hanger $l$, according to the play of the engine-springs. Each of the trucks is swiveled underneath the engine-frame by means of the two blocks $o o$, which are suitably attached to the truck-frame, and the inner face of which is concaved to inclose the spherical chamber D of the hollow axle $b$.

Fitting loosely over the outer spherical face of the blocks $o o$ are two other blocks, $p p$, the outer flanged face of which is adapted to vertically slide in the hanger $q q$, suitably fastened underneath the engine-frame A. The springs $a' a'$, which connect the trucks with the main frame, are placed on each side of the hanger $q$, and far enough out to give the engine proper stability, and suitable bearings are provided for their upper ends in the engine-frame A. The lower ends of the springs rest on plates $b' b^2$, attached to the truck-frame by pendulums or links $e^2 e^3$, which allow the plates $b' b^2$ to swing longitudinally when the trucks turn on curves, the flexibility of the springs $a' a^2$ leaving the trucks free to twist when the track is uneven. The trucks B B' are thus connected to the engine-frame in a manner that leaves them entirely free to turn on curves and follow the inequalities of the track without in the least disturbing the centering of the hollow axle $b$ and of the crank-shaft $d$. Each of the trucks B B' has the crank $d'$ of its shaft $d$ directly connected by the rod $u$ to the piston $y$ of the engine-cylinder E. This latter is suitably bolted to the under side of the locomotive-frame A midway between the trucks B B'. The piston-rod $y$ extends through both heads E' E' of the cylinder, and each end of said rod $y$ carries the cross-head $s$, working in the guide-rod $s'$, suitably mounted in the under side of the locomotive-frame A. The front end of the piston is thus coupled with the front truck, B, while the rear end is coupled with the hind or rear truck, B', both ends working obviously together in the same vertical and horizontal planes, owing to the peculiar construction of the driving-shaft.

In order to compensate for the shortening which, with this direct connection, the angularity of the connecting-rod $u$ would necessarily produce as the higher and lower points of its revolution would be neared, I have designed the devices described below, either of which will accomplish the purpose. The first of these devices consists in the peculiar connection of the piston cross-head $s$ with the connecting-rod $u$, as shown in horizontal section in Fig. 2 and in the diagram, Fig. 3. The cross-head $s$ is made longer than usual, and bearings $s^2$ are provided in its outer end for the rocker $t$, made in the form of a double crank, and extending toward the engine-cylinder E. The wrist $w$ of said rocker bears freely in the box $s^3$, carried on the connecting-rod $u$, and this latter is extended toward the inner end of the cross-head $s$, its end being flattened and fitting loosely in a slot or mortise made across the pin $v$, bearing in the cross-head $s$. By properly proportioning the distance between the center of the rocker crank-pin and that of the slotted pin $v$, as well as the length of the rocker-crank $t$ to the length of the connecting-rod $u$, and to that of the engine-stroke, the connecting-rod $u$ will automatically adjust itself to the varying distance between the crank of the shaft $d$ and the piston cross-head $s$. In the diagram, Fig. 3, the length of the engine-stroke is taken as being twelve inches and the length of the connecting-rod $u$ is fifty-nine inches—that is, from the center of the wrist-pin $j$ of the crank $d'$ to the center of the slotted pin $v$ at commencement or end of the stroke—while the distance between the center of the rocker crank-pin and that of the slotted pin $v$ will be sixteen and a quarter inches, the length of the rocker $t$ itself being three and a half inches. At half-stroke, the distance between the crank-wrist $j$ and the pin $v$ would be 59.309 inches. The rocker $t$ would then be lowered to a point 1.302 inches below its horizontal plane, and as it carries the connecting-rod $u$ with it, as much of said connecting-rod as would be needed to cover the increased distance produced would slide out of the slotted pin $v$—that is, .309 of an inch.

Having thus described my invention, what I claim as new, and desire to secure by Letters Patent, is—

1. In a locomotive, in combination with trucks adapted to freely swivel under the frame of the same, a hollow axle having a crank-shaft passing through and universally jointed with the central part of said axle, and wheels rigidly attached to said axle and provided with hollow crank-pins, whereby the other wheels of the truck may be coupled therewith, while the cranks of the universally-jointed shaft are allowed in the bore of said pins what play the shaft itself has in the hollow axle, whereby as the power of the locomotive-engine is exerted through suitable connections against the cranks of the shaft the hollow axle will be rotated with it, as well as the coupled wheels of the truck, these latter being thus adapted to act as drivers, while they are at the same time free to adjust themselves to the curves of track, substantially as set forth.

2. In a locomotive, in combination with trucks having a hollow axle and a crank-shaft universally jointed together, the cranks of the latter being connected to the driving mechanism, and the wheels of the former being coupled with the other wheels of each truck, so that all of the truck-wheels act as drivers independently of curves in the track, a rocker-shaft suitably hinged in the locomotive-frame and connected to the journals of the shaft-cranks, and slotted hangers depending from the said frame, wherein the bearing-boxes of said crank-journals are adapted to slide up and down, according to the play of the locomotive-springs, whereby the crank-shaft is kept horizontally parallel with the locomotive-frame when inequalities are met with in the track, substantially as set forth.

3. In a locomotive-truck, in combination with a hollow axle having a crank-shaft passing through and universally jointed with the same, driving-wheels rigidly fastened on end of said axle and provided with hollow or ring-like crank-pins, by means of which said driving-wheels are coupled, through ordinary links, to the other wheels of said truck, and are at the same time adapted to receive the cranks of the universally-jointed shaft, allowing said cranks the same play they may have in the conical bore of the hollow axle, substantially as set forth.

4. In a locomotive, driving-wheel trucks adapted, by means substantially as described, to swivel and twist underneath the same, in combination with a connecting-rod attached to the piston cross-head of the engine by means of a crank-rocker and a slotted pin, whereby said connecting-rod is adapted to adjust itself to the varying distance between said cross-head and the driving-shaft crank as the higher and lower points of the revolution of the latter are neared, substantially as set forth.

5. In a locomotive, the wheel-trucks B B', having driving-wheels C, provided with hollow crank-pins $i\ i$, connecting-links $a$ for the outer wheels, C' C$^2$, the hollow axle $b$, having the spherical chamber D for the spherical-faced ring $g$, provided with trunnions $h\ h$, the crank-shaft $d$, having the central ball, $e$, provided with trunnions $ff$, and the double cranks $d'\ d'$, in combination with the locomotive-frame A, having hanger $q$, for the swiveling-blocks $o\ o$ and $p\ p$ of the truck-frames, hanger $l$ for the bearing-boxes $k'\ k'$ of the crank-journals $k\ k$, rocker $m$, and connecting-link $m'$, and with the connecting-rods $u\ u$, crank-rocker $t$, and slotted pin $v$ of the piston cross-heads $s\ s$, all substantially as shown and described, and for the purpose set forth.

6. In a locomotive, in combination with the hanger $q$, blocks $p\ p$, blocks $o\ o$, and the axle $b$, having the spherical chamber D and bearings $c^2\ c^2$, the springs $a'\ a'$, supported on plates $b'\ b^2$, and links $e^2\ e^3$ of the truck-frame, substantially as shown and described, and for the purpose set forth.

In testimony that I claim the foregoing I have hereunto set my hand, at Norwood, in the county of Langlade and State of Wisconsin, in the presence of two witnesses.

EDWARD P. COWLES.

Witnesses:
 THOMAS J. ST. LOUIS,
 JOHN J. JANSEN.